United States Patent [19]

Frei

[11] Patent Number: 4,894,148

[45] Date of Patent: Jan. 16, 1990

[54] DEVICE FOR SEPARATING A HETEROGENEOUS MASS OF SOLID MATERIAL INTO FRACTIONS

[75] Inventor: Josef Frei, Oberehrendingen, Switzerland

[73] Assignee: Organ-Faser Technology B.V., Haarlem, Netherlands

[21] Appl. No.: 43,373

[22] Filed: Apr. 28, 1987

[30] Foreign Application Priority Data

Apr. 28, 1986 [DE] Fed. Rep. of Germany ....... 3614324

[51] Int. Cl.$^4$ ........................................... B03B 13/00
[52] U.S. Cl. .................................... 209/479; 209/485; 209/490; 209/492; 209/930; 241/DIG. 38
[58] Field of Search ............... 209/479, 480, 490, 492, 209/494, 495, 485, 493, 930, 506, 925; 241/DIG. 38, 79.1, 24

[56] References Cited

U.S. PATENT DOCUMENTS

| | | | |
|---|---|---|---|
| 923,455 | 6/1909 | Stebbins | 209/493 |
| 2,661,843 | 12/1953 | Sparks | 209/479 |
| 3,225,297 | 12/1965 | Bhrany | 209/479 |
| 3,367,501 | 2/1968 | Eveson | 209/492 |
| 3,472,379 | 10/1969 | Lainas et al. | 209/479 |
| 3,804,250 | 4/1974 | Dankesreiter | 209/490 |

FOREIGN PATENT DOCUMENTS

| | | | |
|---|---|---|---|
| 89529 | 7/1895 | Fed. Rep. of Germany | 209/480 |
| 1302591 | 7/1961 | France | 209/479 |
| 2091715 | 8/1982 | United Kingdom | 241/79.1 |

Primary Examiner—Donald T. Hajec
Attorney, Agent, or Firm—Scully, Scott, Murphy & Presser

[57] ABSTRACT

A device for separating a heterogeneous mass of solid material into fractions. The constituents of a heterogeneous mass of solid material are comminuted and dried and then separated into fractions. The mass is received in a trough-shaped and subjected to vibration causing high density constituents to segregate downwards and low density constituents to segregate upwards, so that the fractions may be removed at different layer levels.

2 Claims, 2 Drawing Sheets

DEVICE FOR SEPARATING A HETEROGENEOUS MASS OF SOLID MATERIAL INTO FRACTIONS

TECHNICAL FIELD OF THE INVENTION

The present invention relates to a device for separating the constituents of a heterogeneous mass of solid material in household, industrial and other similar waste, and more particularly, to a device for separating high density constituents from low density constituents in the heterogeneous mass of solid material.

BACKGROUND OF THE INVENTION

Before the materials in rubbish or waste can be supplied for reuse these materials must be separated. Inter alia, the specific gravity or density of the materials provides a criterion for the separation. In practice many processes are known for the separation, e.g. air classification, winnowing, flotation, etc. To use these processes effectively one necessary condition is that there is only a relatively small difference between the smallest and largest particles. When this condition is met, the mass can be separated into specific materials of the same density. According to the kind of further processing, e.g. particularly in processing to building materials, the above-mentioned separation criterion suffices for an effective fractionation. Should separation of individual materials be necessary a further separation according to criteria specific to the materials must be performed.

In one known process the waste is comminuted, dried and then separated into fractions by one of the above-mentioned methods. The comminution is to ensure substantially uniform particle size, and the drying is to prevent the individual particles from sticking together.

Since it is hardly possible to start with waste that has a substantially uniform particle size from the beginning, the known separation process involves a substantial expenditure of work caused by the comminution, by which the processing time is considerably increased.

Specific devices such as classification devices, flotation devices and the like are used for performing the above-mentioned separation process. Not only are such devices expensive, but they also need to be constructed on a large scale in order to produce the effects needed to bring about the separation.

OBJECT OF THE INVENTION

The object of the present invention is to provide a device for separating the constituents of a heterogeneous mass of solid material in household, industrial and other similar waste, in which fractionation of the constituents is independent of the particle size of the mass.

SUMMARY OF THE INVENTION

The mass is subjected on a carrier to vibration that separates the high density and low density fractions from one another in the vertical direction, i.e. the high density fraction goes downwards and the low density fraction goes upwards. In a mass prepared in this way all that is then needed to obtain the fractions is to remove the constituents of the mass in the upper and lower zones. The constituents can be removed in two or more superimposed layers, whereby the mass can be separated into two or more fractions.

The important advantage of the process of the invention is that it can be performed even in the case of a mass of particles of different sizes, so that no comminution is needed for the separation. In addition the process of the invention represents a very simple process, since it does not require any other medium such as air or liquid for the separation.

For the separation procedure the material must be kept constantly in motion. The amplitudes or oscillations must be so intense that the whole of the material, right up to the surface, is brought into motion. The extent of the movement must not be so great that the material is thrown about from the bottom or side walls of the container, as otherwise mixing results instead of operation.

The material to be separated should be so dry that it no longer sticks together. Sticking together would impair the flow effect occurring in the process of the invention.

In the present invention the fractions can be removed after the separation either manually or mechanically at rest or continuously during the vibration. Light constituents, e.g. paper, pieces of cloth, wood or other organic materials are removed from the upper zone of the mass, e.g. upwards. The high density parts of the mass, e.g. glass, stones, metal, hard plastic and the like are removed from the lower zone of the mass. This can be done both manually and mechanically and by the removal of successive layers or simultaneously.

The vibration can be produced both by a circular movement and by a rectilinear reciprocating movement. It is thus possible to bring about not only a vertical flow effect but also a horizontal flow effect. This makes it possible to introduce the mass at one end of the container and to remove the fractions at the other end.

In the boundary zone between the layers that each form a fraction there is of course a mixture of the constituents. In addition, it is contemplated to remove a further intermediate fraction in the boundary zone between two fractions of the mass, and if desired to return it to the separating process, whereby the mixed region between two fractions is again subjected to the separating process and a cleaner separation of the fractions is achieved. Within the scope of the invention it is possible in this way to remove intermediate fractions not only between two fractions but also between a larger number of fractions, and thereby to effect the clean separation that is aimed at between the two fractions that are to be recovered.

A further advantage that can be obtained according to the claims is that separation of inorganic and organic particles is possible. Above all, organic fibres can be cleaned from fine mineral dust.

The device of the invention is marked in particular by a construction that is both simple and small. In contrast to the known process mentioned in the introduction, no auxiliary separating medium such as air or liquid is needed. This is enough to explain the simple and small-scale construction, since it does not need to receive the auxiliary medium, as is e.g. the case with a flotation device. As has already been explained, the mass in the device of the invention is subjected to vibration that causes segregation of the low density constituents of the mass upwards and of the high density ones downward.

The mass is on the whole given a greater opportunity for the separation process on an increased path of movement. In addition the supply and take-off of the material are spaced apart horizontally, so that the take-off can be effected at a position where the separation process has already taken place. These arrangements are thus particularly suitable for continuous operation.

Since the upper fraction is a light fraction, it is recommended to connect a suction device to the upper take-off device, adjusted according to the material so that the fraction beneath the light fraction is not taken off with it.

Further features contribute to simpler removal of the heavy fraction. As to this it may be remarked that the take-off device for the heavy fraction may be made adjustable in height by a flap or slide, and be adjusted so that a particular layer always remains in the container, while allowing light fraction pieces to escape.

BRIEF DESCRIPTION OF THE DRAWINGS

The invention will now be explained with reference to preferred exemplary embodiments shown in drawings, in which.

DETAILED DESCRIPTION OF THE PREFERRED EMBODIMENTS

Figure 1:
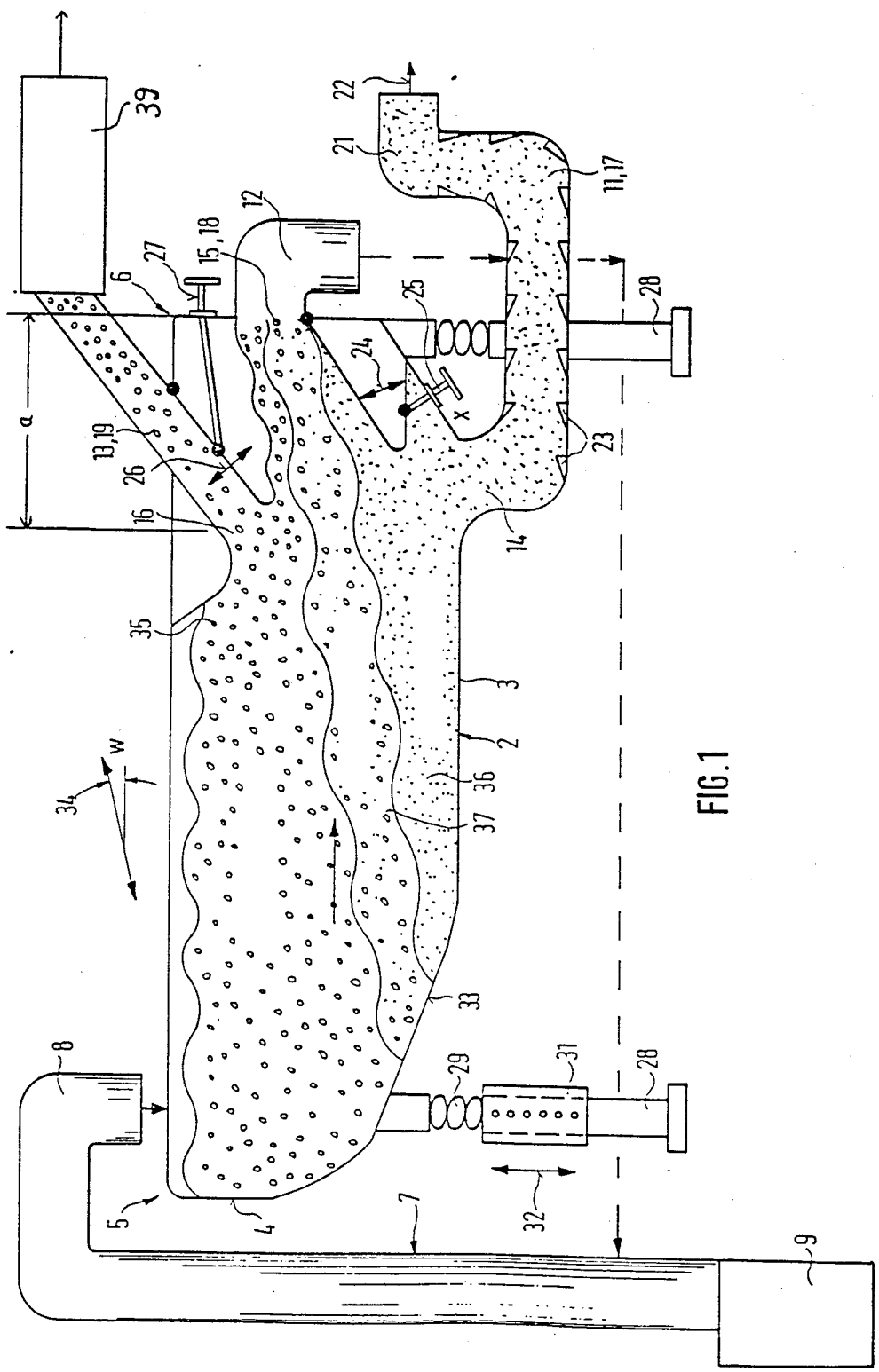
FIG. 1 shows in section a device for separting a heterogeneous mass of solid material, arranged according to the invention.

The device indicated generally by 1 in the Figures enables a heterogeneous mass of solid material to be separated into two or three fractions, namely a light fraction, a heavy fraction and optionally an intermediate fraction.

The device 1 is made up of an elongated container 2 having a base 3, two facing side walls and two facing end walls 4. The end at the left in the drawing will be called the charging end 5 and the right-hand end will be called the take-off end 6. The charging of the material 7 takes place through a charging pipe 8, e.g. in the form of a rising pipe extending from a material bunker 9 to above the charging end 5 of the container.

At the other end, the take-off end 6 of the container 2, three take-off devices 11 to 13 are provided for the fractions mentioned. The take-off devices 11 to 13 comprise openings 14 to 16 in the container 2, to which take-off pipes 17 to 19 are connected. The take-off device 11 for the heavy fraction is connected to the base 3 of the container 2 and is made up of a U-shaped take-off pipe 17 that runs from the base 3 first downwards and then further horizontally along the longitudinal axis. The arrangement is such that the last-named horizontal section 21 of the take-off pipe 17 is arranged above the base 3. In the take-off pipe 17 and on its inner wall are arranged saw-tooth shaped conveyor elements 23 directed in the take-off direction 22, whose function will be further described below.

The take-off device 12 for the intermediate fraction is situated above the take-off device 11 in the associated end wall 4 of the container 3. The take-off pipe 18 connected with the take-off opening 15 is connected either with the charging pipe 8 or with the bunker 9, as indicated by a broken line. The height of the take-off opening 15, i.e. the distance between this and the base 3 of the container 2, is adjustable and can be fixed in the chosen setting (cf. double arrow 24). An adjusting device indicated by 25 serves this purpose.

The take-off pipe 19 of the take-off device 13 for the light fraction projects into the container 2 from above in a downwardly sloping position oblique to the charging end 5 and ends above the take-off opening 15 for the intermediate fraction. The arrangement is such that the take-off pipe 19 is arranged in the third of the length of the container 2 at the take-off end 6 so that there is a horizontal separation between the takeoff opening 16 and the associated end wall 4. The slope of the take-off pipe 16 can likewise be varied (cf. double arrow 26). An adjusting device 27, likewise only generally indicated is provided on the end wall 4 for this purpose.

The container 2 stands on legs 28 in which elastic members 29 such as rubber buffers are arranged.

The relative heights of the ends 5, 6 of the container 2 can be adjusted. For this purpose it suffices to make the height of one end adjustable relative to the other. In the present example the back legs 28 associated with the charging end have a builtin adjusting device, indicated generally by 31, which enables the height of the charging end 5 to be adjusted as desired (see double arrow 32).

In the region of the charging end 5 the bottom of the container 2 is shaped so as to slope obliquely downwards over part of its length towards the take-off end. The oblique section of the bottom is indicated by 33.

When the device 1 is in use, solid heterogeneous material is charged into the container through the material charger 7. A vibrator (not shown) transfers to container 2 a vibration such as to cause segregation of the high density constituents downwards and the low density constituents upwards. In the present example the vibration (see the double arrow 34) is directed obliquely to the horizontal longitudinal direction of the container 2 and forms an acute angle w, open towards the take-off end 6, with the horizontal longitudinal direction. During the vibration, not only does segregation of the high density constituents downwards and the low density constituents upwards occur, but also the material migrates from the charging end 5 to the take-off end 6, whereby the segregation of the constituents is controlled. A process of displacement of the constituents takes place in which the constituents with the higher specific gravity slide downwards while those with the lower specific gravity go to the top. The light fraction 35 collects in the upper region of the container 2 and the heavy fraction 36 in the lower region of the container. The constituents of the mass in the intermediate region (boundary region) are indicated as the boundary fraction 37.

The displacement of the mass from the charging end 5 to the take-off end 6, brought about by a special vibration that accelerates the mass in the direction of the take-off end 6, and/or by the at least partly oblique bottom 3, contributes to the automatic removal of the heavy fraction 36 through the take-off pipe 17 and of the boundary fraction through the take-off pipe 18. During this process the saw-toothed conveying elements 23 in the take-off pipe 17 exert a conveying action on the heavy fraction 36 in the take-off pipe 17. From the take-off pipe 17, which is stepped upwards from the container bottom, the heavy fraction goes to a store, e.g. a bunker. The boundary fraction is delivered through the take-off pipe 18 to the charging pipe 8 and thence back to the separating process. The light fraction 35 is sucked off by an exhaust device 39 connected to the take-off pipe 19 and led into the take-off device, likewise into a store, e.g. a bunker. The delivery and separation of the material and the taking off of the fractions take place continuously.

The separation of the fractions, as described above, is independent of the grain size of the material, since this has no influence on separation by specific gravity. Thus there is basically no need for pre-comminution of the material before the separation process. However, precomminution is useful, since by this means the pieces are already given a practical size in advance and the charging, the take-off and the separation are all facilitated.

With an elongated container 2 having charging and take-off ends 5, 6 it is important that the resultant (arrow 34) of the vibration has a horizontal component directed towards the take-off end 6. The vibration can be produced both by a rotating and by a reciprocating rectilinear movement, by which the migration of the material can be brought about by different amplitudes or accelerations. The size of the angle w can differ from case to case.

The invention is not limited to an elongated container or to horizontal migration of the material. The segregation of the constituents of different specific gravity is already brought about by a vertical vibration.

Figure 2:
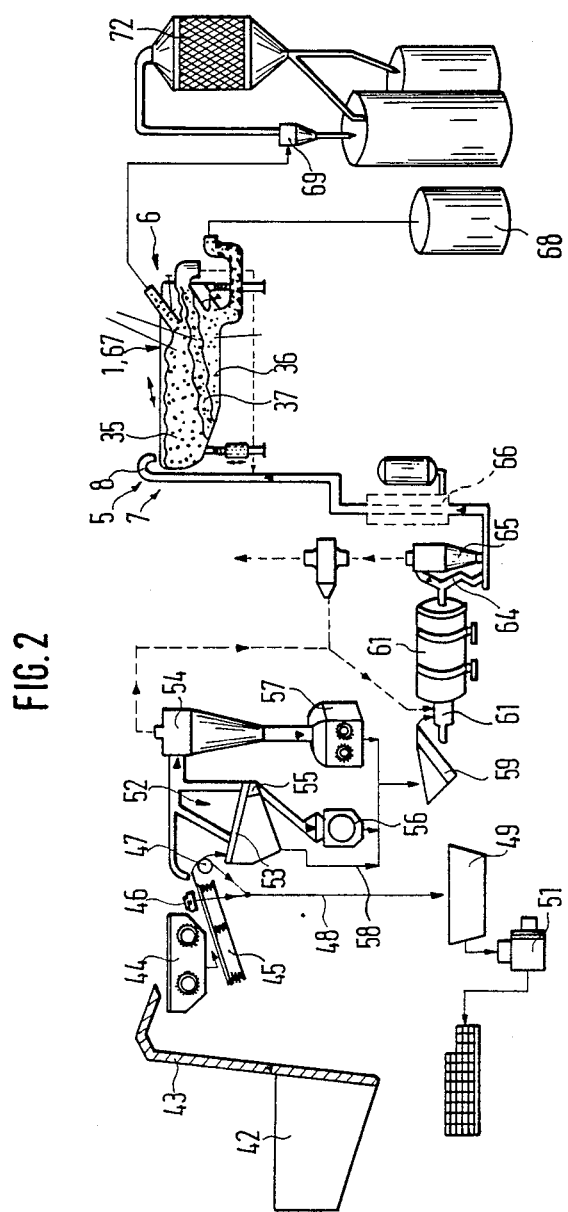
FIG. 2 shows the device as part of a plant for working up waste.

The separation process according to the invention and the apparatus can advantageously be used for working up waste. In such a case the bunker 9 contains precomminuted and dried rubbish, the drying being necessary to prevent the constituents from sticking together. In working up waste (rubbish), sweepings or the like the light fraction 35 comprises fibres and light pieces of paper, textiles, foil, wood and other organic substances. The heavy fraction 36 comprises high density pieces such as glass, stones, metals, hard plastic and the like. An example of this will now be described with reference to the working up plant 41 according to FIG. 2.

The wastes are tipped into a collecting bunker 42. Preferably waste is used that has not had any, or only a short, time to ferment, and also has not been subjected to any treatment such as primary comminution, presorting, compacting on dumps or chemical treatment. The use of fresh organic waste has the advantage that the fibrous starting material can be given the desired structure and that the important constituents such as cellulose and lignin have not been removed or destroyed.

The waste bunkered in this way goes, continuously or discontinuously, via a mechanical transport device 43 to a primary comminution unit 44. The purpose of this is on the one hand to loosen the delivered waste into its loose components and on the other hand, by cutting, chopping and/or ripping, to reduce the waste, which is very varied in its size and composition, to a permissible size for further processing. For this step cutter or beater mills as well as choppers or rippers can be used. In order to ensure trouble-free processing, and to achieve the desired structure, fineness and purity of the end product, it is preferred to use a slow-running cutting mill of which various designs are commercially available. Conveniently a design with multiple cutter blocks lying next to one another and running counter to one another is employed. In addition the multiple cutter blocks should work at low speed and the individual blocks at different speeds. In addition all the blocks should be reversible to ensure safety, performance and automatic cleaning. Such a machine is commercially available under the name "SHREDDER". Similar machines with the same name are also employed for breaking up used cars and other sheet metal products.

The waste thus broken up by the primary comminuting unit 44 and primarily comminuted to a size of about 100 mm falls freely on to a conveyor 45 consisting of a vibrating transport channel.

In order to ensure trouble-free operation in the later parts of the plant it is important that pieces of iron which may be present in the waste should be completely separated out. In order to achieve this, the conveyor 45 conveys the waste as a uniformly aligned, relatively thin moving layer past a magnetic belt unit 46 arranged above the conveyor 45 and at the end throws it on to a rotating drum magnet 47 underneath. Since the quantities of waste emerging from the primary comminuting unit 44 fluctuate, the conveyor 45 is provided before the magnetic belt unit 46 with a levelling arrangement (not shown).

The magnetic belt unit 46 has the object of separating out the pieces of iron present in the upper half of the moving layer. The rotating drum magnet 47 serves to remove the pieces of iron lying in the lower half of the moving layer of waste.

The magnetic units 46 and 47 are connected via a conveyor 48 to a collecting bunker 49. From the collecting bunker 49 the metal which has been separated goes into a press 51, which compacts the pieces of iron which have been separated out into commercial packets which can subsequently be supplied to a scrap metal foundry.

The waste freed from pieces of iron in this way is then fed to a first fractionating unit 52. The latter has a vibrating screen 53 for producing a fine fraction, the mesh width of this screen being approximately 6 to 8 mm. The arrangement also includes a suction unit 54, directed towards the upper side of the vibrating screen 53, for producing a first, low density coarse fraction and, at the lower end of the inclined vibrating screen 53, a receiving conduit 55 to receive the material left on the vibrating screen 53, which either cannot pass through the screen because of its size or cannot be sucked off because of its weight, to produce a first high density fraction.

Such a separation into three first fractions gives the advantage that the following comminution units 56 and 57 are relieved of those fine pieces which do not exceed the desired final size. The proportion of these fine pieces normally amounts to about 15% by weight, i.e. about 15% energy is saved in the subsequent comminution. The fine material thus separated out is mixed back again with the waste which has undergone secondary comminution in the two comminution units 56 and 57, via a by-pass line 58 that avoids these units.

The suction unit 54 can consist of a commercial appliance, such as is employed e.g. in the chip and fodder industry. The low density material sucked off out of the stream of waste by the suction unit 54 consists mainly of paper, cardboard, foil, textiles and wood chips, i.e. pieces of organic material and is fed for final structuring and comminution to the comminution unit 57 constructed as a fine chopper. Such comminution units are available commercially under the name fine choppers, chippers or fine mills. It has been found convenient to use rotary comminutors in which rotary cutters work against fixed cutters or rotary cutters against rotary cutters and which are provided with a permeable barrier to obtain the final material size.

The high density second coarse fraction, freed by the fractioning unit 52 both from the fine pieces and from the low density pieces, and consisting in practice predominantly of pieces of inorganic material, is subjected in the separate comminution unit 56 to a granulating comminution procedure. The comminution unit 56 has the object of bringing the different pieces of incoming waste to the final size that is desired and required for complete further utilization, corresponding to a sieve mesh width of around 6 mm. Such comminution units 56 are commercially available under the designation hammer, impact or beater mills, and can be employed if they have a permeable barrier adjusted to the smallest particle size to be obtained.

The fractions coming from the comminution units 56 and 57, as well as from the by-pass line 58, are fed together to a collecting container 59. From the latter the stored material is fed to a drying and sterilizing unit 61. This unit 61 has the object of drying the resulting material to a definite, constant residual moisture content, and destroying the substances in the material which are undesirable on health grounds, such as e.g. pathogenic bacteria. To this end temperatures of over 100° C. can be reached in the drying and sterilizing unit 61, and the residence time in the drying and sterilising unit 61 can likewise be regulated. The supply of hot dry air from the heating device 62 via the recirculation line 63 and the exhaustion of the air enriched with moisture take place continuously and can likewise be regulated so as to enable the residual moisture content of the material emerging from the drying unit 61 to be regulated to a desired value in this way.

After the drying unit 61 the material thus treated is divided by means of a first separating device 64 into a low and a high density fraction, and thereafter the low density fraction is fed to an exhaust air separator 65 in the form of a separator cyclone to remove it from the moist exhaust air coming from the drying operation. In this way the wear in the exhaust air separator 65 can be considerably reduced and its reliability of operation at the same time increased. The material coming from the exhaust air separator 65 is then again combined with the previously separated high density fraction and supplied via an ozone treatment device 66 to a second separator 67 that corresponds to the device according to FIG. 1 and separates the material into the light fraction 35, the heavy fraction 36 and the intermediate fraction 37. The latter is returned to the separating process. The heavy fraction 36 represents a granular fraction and goes via a conveyor to a stove 68 or a bunker. The light fraction 35, which has preferably been sucked off, is delivered to a separator 69 from which the light fibrous constituents go to the store (bunker) 71 while fine dusty pieces are delivered to a further separator 72 or filter, which brings about a final separation of fibrous constituents which likewise go to the store 71, and of dust, which goes to a bunker 73.

The light fraction going to the stove 71 comprises a high-grade, fibrous material that can be further utilised as raw or addition material in the manufacture of paper, boards or other constructional material such as stone, bitumen coatings or concrete and for heating or packaging (combustion, hydrolysis, bio gas production), if desired after pressing to briquettes or pellets.

What is claimed is:

1. A device for separating high density and low density constitutents from a heterogeneous mass of solid material in household, industrial, and other similar waste, in which the material is first dried and then separated into said constitutents, comprising a trough-shaped container having a material charging end for receiving the mass, a vibrator connected to said container to produce vibrations causing the segregation of said high density constituents downwards and said low density constituents upwards, said container having a lower zone and an upper zone; take-off devices in both said lower zone and upper zone, and an intermediate take-off device arranged between the take-off devices in said upper and lower zones, said take-off devices being operable for removing the separated constituents from the container, said intermediate take-off device being connected to a material charging device which leads back to the upper zone of the container, said take-off devices in said upper and lower zones and said intermediate take-off device each having a take-off opening and a conveyor means subsequent thereto, each of said take-off devices further constituting pipes such that at least one of the take-off openings is arranged in a wall of the container, wherein the conveyor means of the take-off device in said upper zone includes an exhaust device connected thereto, the take-off pipe of said device in said upper zone projects into the container from above, and further wherein the take-off pipe of said device in said upper zone is inclined towards the material charging end of said container and the inclination is adjustable to ensure that the take-off device in the upper zone removes only the low density constitutents.

2. The device according to claim 1, wherein the container includes a container bottom, the take-off pipe of at least the take-off device in said lower zone is stepped upwards from the container bottom, the conveyor means of the take-off device in said lower zone includes a saw-toothed conveyor element, and wherein said intermediate take-off device is adjustable.

* * * * *